US008833098B2

(12) United States Patent
Wiggs

(10) Patent No.: US 8,833,098 B2
(45) Date of Patent: Sep. 16, 2014

(54) DIRECT EXCHANGE HEATING/COOLING SYSTEM

(75) Inventor: B. Ryland Wiggs, Franklin, TN (US)

(73) Assignee: Earth to Air Systems, LLC, Franklin, TN (US)

( * ) Notice: Subject to any disclaimer, the term of this patent is extended or adjusted under 35 U.S.C. 154(b) by 1309 days.

(21) Appl. No.: 12/174,485

(22) Filed: Jul. 16, 2008

(65) Prior Publication Data

US 2009/0065173 A1 Mar. 12, 2009

Related U.S. Application Data

(60) Provisional application No. 60/949,910, filed on Jul. 16, 2007.

(51) Int. Cl.
*F24J 3/08* (2006.01)
*G05D 15/00* (2006.01)
*G05D 16/00* (2006.01)
*G05D 23/00* (2006.01)
*F25D 23/12* (2006.01)

(52) U.S. Cl.
USPC ............................... 62/260; 165/45; 165/281

(58) Field of Classification Search
USPC ............................... 62/260; 165/45, 281, 287
See application file for complete search history.

(56) References Cited

U.S. PATENT DOCUMENTS

| | | |
|---|---|---|
| 2,503,456 A | 4/1950 | Smith |
| 3,099,140 A | 7/1963 | Leimbach |
| 3,183,675 A | 5/1965 | Schroeder |
| 3,452,813 A | 7/1969 | Watkins et al. |
| 3,986,345 A | 10/1976 | Pilz et al. |
| 4,010,731 A | 3/1977 | Harrison |
| 4,094,356 A | 6/1978 | Ash et al. |
| 4,169,554 A | 10/1979 | Camp |

(Continued)

FOREIGN PATENT DOCUMENTS

| | | | |
|---|---|---|---|
| JP | 2006 284022 A | | 10/2006 |
| JP | 2006284022 A | * | 10/2006 |

(Continued)

OTHER PUBLICATIONS

JP 2006284022 A translation.*

(Continued)

*Primary Examiner* — Brandon M Rosati
*Assistant Examiner* — Jon T Schermerhorn
(74) *Attorney, Agent, or Firm* — Miller, Matthias & Hull LLP

(57) ABSTRACT

A direct exchange heating/cooling system includes a specially designed supplemental air-source heat exchanger (also referred to herein as a High Level Heat Dissipater ("HLHD"). The HLHD is coupled to the primary vapor/hot gas line exiting the system's compressor at a point between the compressor unit and the sub-surface geothermal heat exchange tubing, and is operable only in the cooling mode of system operation. The HLHD includes heat exchange tubing that is sheltered from rain/moisture and has supply and discharge refrigerant transport tubing with relatively equally sized interior diameters, designed solely for mostly vapor (as opposed to liquid) refrigerant transport. The HLHD incorporates at least two check valves, or the like, so as to force hot compressor discharge gas through the HLHD in the cooling mode, and so as to prohibit geothermally warmed refrigerant gas flow through the HLHD in the heating mode. The HLHD has specially designed heat exchangers and may optionally include a fan.

10 Claims, 2 Drawing Sheets

(56) References Cited

U.S. PATENT DOCUMENTS

| | | |
|---|---|---|
| 4,182,133 A | 1/1980 | Haas et al. |
| 4,189,848 A | 2/1980 | Ko et al. |
| 4,224,805 A | 9/1980 | Rothwell |
| 4,257,239 A | 3/1981 | Partin et al. |
| 4,286,651 A | 9/1981 | Steiger et al. |
| 4,290,266 A | 9/1981 | Twite et al. |
| 4,325,228 A | 4/1982 | Wolf |
| 4,375,831 A | 3/1983 | Downing, Jr. |
| 4,378,787 A | 4/1983 | Fleischmann |
| 4,383,419 A | 5/1983 | Bottum |
| 4,392,531 A | 7/1983 | Ippolito |
| 4,448,237 A | 5/1984 | Riley |
| 4,448,238 A | 5/1984 | Singleton et al. |
| 4,459,752 A | 7/1984 | Babcock |
| 4,536,765 A | 8/1985 | Kaminski |
| 4,538,673 A | 9/1985 | Partin et al. |
| 4,544,021 A | 10/1985 | Barrett |
| 4,700,550 A | 10/1987 | Rhodes |
| 4,715,429 A | 12/1987 | Mogensen |
| 4,741,388 A | 5/1988 | Kuroiwa |
| 4,798,056 A | 1/1989 | Franklin |
| 4,858,679 A | 8/1989 | Sakaya et al. |
| 4,858,694 A | 8/1989 | Johnson et al. |
| 4,867,229 A | 9/1989 | Mogensen |
| 4,936,110 A | 6/1990 | Kuckens |
| 4,993,483 A | 2/1991 | Harris |
| 5,025,634 A | 6/1991 | Dressler |
| 5,025,641 A | 6/1991 | Broadhurst |
| 5,029,633 A | 7/1991 | Mann |
| 5,038,580 A | 8/1991 | Hart |
| 5,054,297 A | 10/1991 | Furuhama |
| 5,062,276 A | 11/1991 | Dudley |
| 5,105,633 A | 4/1992 | Briggs |
| 5,131,238 A | 7/1992 | Meckler |
| 5,136,855 A | 8/1992 | Lenarduzzi |
| 5,199,486 A | 4/1993 | Balmer et al. |
| 5,207,075 A | 5/1993 | Gundlach |
| 5,224,357 A | 7/1993 | Galiyano |
| 5,275,008 A | 1/1994 | Song et al. |
| 5,277,032 A | 1/1994 | See et al. |
| 5,313,804 A | 5/1994 | Kaye |
| 5,381,672 A | 1/1995 | Haasis |
| 5,383,337 A | 1/1995 | Baker |
| 5,388,419 A | 2/1995 | Kaye |
| 5,419,135 A | 5/1995 | Wiggs |
| 5,461,876 A | 10/1995 | Dressler |
| 5,477,703 A | 12/1995 | Hanchar et al. |
| 5,477,914 A | 12/1995 | Rawlings |
| 5,533,355 A | 7/1996 | Rawlings |
| 5,560,220 A | 10/1996 | Cochran |
| 5,561,985 A | 10/1996 | Cochran |
| 5,564,282 A | 10/1996 | Kaye |
| 5,598,887 A | 2/1997 | Ikeda et al. |
| 5,622,057 A | 4/1997 | Bussjager et al. |
| 5,623,986 A | 4/1997 | Wiggs |
| 5,651,265 A | 7/1997 | Grenier |
| 5,671,608 A * | 9/1997 | Wiggs et al. ............ 62/260 |
| 5,706,888 A | 1/1998 | Ambs et al. |
| 5,725,047 A | 3/1998 | Lopez |
| 5,738,164 A | 4/1998 | Hildebrand |
| 5,758,514 A | 6/1998 | Genung |
| 5,771,700 A | 6/1998 | Cochran |
| 5,816,314 A | 10/1998 | Wiggs et al. |
| 5,875,644 A | 3/1999 | Ambs et al. |
| 5,934,087 A | 8/1999 | Watanabe et al. |
| 5,937,665 A | 8/1999 | Kiessel et al. |
| 5,937,934 A | 8/1999 | Hildebrand |
| 5,941,238 A | 8/1999 | Tracy |
| 5,946,928 A * | 9/1999 | Wiggs ....................... 62/260 |
| 5,983,660 A * | 11/1999 | Kiessel et al. ............ 62/324.5 |
| 6,138,744 A | 10/2000 | Coffee |
| 6,212,896 B1 | 4/2001 | Genung |
| 6,227,003 B1 | 5/2001 | Smolinsky |
| 6,276,438 B1 | 8/2001 | Amerman et al. |
| 6,354,097 B1 | 3/2002 | Schuster |
| 6,390,183 B2 | 5/2002 | Aoyagi et al. |
| 6,450,247 B1 | 9/2002 | Raff |
| 6,521,459 B1 | 2/2003 | Schooley et al. |
| 6,615,601 B1 | 9/2003 | Wiggs |
| 6,751,974 B1 | 6/2004 | Wiggs |
| 6,789,608 B1 | 9/2004 | Wiggs |
| 6,892,522 B2 | 5/2005 | Brasz et al. |
| 6,931,879 B1 | 8/2005 | Wiggs |
| 6,932,149 B2 | 8/2005 | Wiggs |
| 6,971,248 B1 | 12/2005 | Wiggs |
| 7,080,524 B2 | 7/2006 | Wiggs |
| 7,146,823 B1 | 12/2006 | Wiggs |
| 7,191,604 B1 | 3/2007 | Wiggs |
| 7,234,314 B1 | 6/2007 | Wiggs |
| 7,401,641 B1 | 7/2008 | Wiggs |
| 2002/0132947 A1 | 9/2002 | Smith et al. |
| 2002/0194862 A1 | 12/2002 | Komatsubara et al. |
| 2005/0081542 A1* | 4/2005 | Braun et al. ............ 62/186 |
| 2006/0096309 A1* | 5/2006 | Wiggs ....................... 62/282 |
| 2006/0288724 A1* | 12/2006 | Ambs et al. ............ 62/260 |

FOREIGN PATENT DOCUMENTS

| | | |
|---|---|---|
| WO | WO-2004/027333 A2 | 4/2004 |
| WO | WO-2004/013551 A1 | 12/2004 |
| WO | WO-2005/114073 A2 | 12/2005 |
| WO | WO-2007/046788 A2 | 4/2007 |

OTHER PUBLICATIONS

1998 ASHRAE Refrigeration Handbook, Jan. 1, 1998, Chapter 2, "System Practices for Halocarbon Refrigerants," pp. 2.1-2.9, US.

* cited by examiner

DIRECT EXCHANGE HEATING/COOLING SYSTEM

CROSS-REFERENCE TO RELATED APPLICATION

The present application claims the benefit of U.S. Provisional Application No. 60/949,910 filed on Jul. 16, 2007.

FIELD OF THE DISCLOSURE

The present disclosure relates to a geothermal "direct exchange" ("DX") heating/cooling system, comprising various design improvements.

BACKGROUND OF THE DISCLOSURE

Geothermal ground source/water source heat exchange systems typically use fluid-filled closed loops of tubing buried in the ground, or submerged in a body of water, so as to either absorb heat from, or to reject heat into, the naturally occurring geothermal mass and/or water surrounding the buried or submerged fluid transport tubing. The tubing loop is extended to the surface and is then used to circulate the naturally warmed or cooled fluid to an interior air heat exchange means.

Common and older design geothermal water-source heating/cooling systems typically circulate, via a water pump, a fluid comprised of water (or water with anti-freeze) in plastic (typically polyethylene) underground geothermal tubing so as to transfer geothermal heat to or from the ground in a first heat exchange step. Via a second heat exchange step, a refrigerant heat pump system is used to transfer heat to or from the water. Finally, via a third heat exchange step, an interior air handler (typically comprised of finned tubing and a fan, as is well understood by those skilled in the art) is used to transfer heat to or from the refrigerant to heat or cool interior air space.

Newer design geothermal DX heat exchange systems, where the refrigerant fluid transport lines are placed directly in the sub-surface ground and/or water, typically circulate a refrigerant fluid, such as R-22 or the like, in sub-surface refrigerant lines, typically comprised of copper tubing, to transfer geothermal heat to or from the sub-surface elements via a first heat exchange step. DX systems only require a second heat exchange step to transfer heat to or from the interior air space, typically also by means of an interior air handler. Consequently, DX systems are generally more efficient than water-source systems due to fewer heat exchange steps and because no water pump energy expenditure is necessary. Further, since copper is a better heat conductor than most plastics, and since the refrigerant fluid circulating within the copper tubing of a DX system generally has a greater temperature differential with the surrounding ground than the water circulating within the plastic tubing of a water-source system, generally, a DX system requires less excavation and drilling and therefore has lower installation costs than a water-source system.

While most in-ground/in-water DX heat exchange designs are feasible, various improvements have been developed to enhance overall system operational efficiencies. Several such design improvements, particularly in direct expansion/direct exchange geothermal heat pump systems, are taught in U.S. Pat. No. 5,623,986 to Wiggs; in U.S. Pat. No. 5,816,314 to Wiggs, et al.; in U.S. Pat. No. 5,946,928 to Wiggs; and in U.S. Pat. No. 6,615,601 B1 to Wiggs, the disclosures of which are incorporated herein by reference. Such disclosures encompass both horizontal and vertical oriented, sub-surface, geothermal, heat exchange means using conventional refrigerants, such as R-22. The use of a refrigerant operating at higher pressures than R-22, such as R-410A, has been found to be advantageous for use in a DX system incorporating at least one of the disclosures as taught herein. R-410A is an HFC azeotropic mixture of HFC-32 and HFC-125.

DX heating/cooling systems have multiple primary objectives. The first is to provide the greatest possible operational efficiencies. This directly translates into providing the lowest possible heating/cooling operational costs, as well as other advantages, such as, for example, materially assisting in reducing peaking concerns for utility companies. A second is to operate in an environmentally safe manner via the use of environmentally safe components and fluids. A third is to provide an economically feasible installation means at the lowest possible initial cost. A fourth is to provide sub-surface installation means within the smallest surface area possible. A fifth is to increase interior comfort levels. A sixth is to increase long-term system durability, and a seventh is to facilitate ease of service and maintenance.

While typically more efficient that conventional heating/cooling systems, DX systems have experienced practical limitations associated with the relatively large surface land areas needed to accommodate the sub-surface heat exchange tubing. First generation systems using R-22 refrigerant, for example, typically require 500 square feet of land area per ton of system design capacity to accommodate a shallow (within 10 feet of the surface) matrix of multiple, distributed, copper heat exchange tubes. Early generation borehole designs still required about one 50-100 foot (maximum) depth well/borehole per ton of system design capacity, preferably spaced at least about 20 feet apart. Such requisite surface areas effectively precluded system applications in many commercial and/or high density residential applications.

While previously implemented DX systems generally achieve their primary function of heating and cooling interior space, they have exhibited some problems during the cooling mode of operation, which primarily result from an overheating of the ground surrounding the sub-surface geothermal heat exchange tubing, causing excessively high compressor head and suction pressures. Excessively high head/suction pressures result in operational efficiency losses, higher operational power draws, premature damage to system components, and correspondingly higher operating costs. Such problems are typically caused by DX systems operating in poorly conductive soils, by over-design load outdoor temperatures, by improper refrigerant charging, and/or by under-signed ("short-looped") sub-surface heat exchange tubing. Some of the above problems, such as over-design load temperatures caused by climatic warming or the like or poorly conductive soils caused by an unforeseen drop in ground water levels, are natural and therefore unavoidable. However, many of the problems are caused by original system design error, which is primarily observed in the cooling mode of operation. When the heating and cooling loads are equal, about 30% less exposed geothermal heat transfer tubing surface area may be required in the heating mode of operation than in the cooling mode of operation.

Accordingly, it is desirable to improve upon earlier and former DX system technologies, so as to provide a means to enhance system operational efficiencies, reduce installation costs, and/or eliminate common problems encountered in the cooling mode of operation with DX system designs.

SUMMARY OF THE DISCLOSURE

The DX systems disclosed herein eliminate the excessively high head/suction pressures encountered by conventional DX systems when operating in the cooling mode, when such excessively high pressures are caused by excessively high sub-surface ground temperatures. Excessively high sub-surface ground temperatures in the immediate vicinity of the sub-surface geothermal heat exchange tubing are typically caused by soils/ground with poor heat conductivity, by over-design climatic temperatures, or by system sizing/design error (system under-sizing). Thus, it is an object of the present disclosure to further enhance and improve the efficiency and practical applicability of predecessor direct expansion/direct exchange ("DX") geothermal heating/cooling systems that periodically and commonly encounter the problem of excessively high system operational pressures when operating in the cooling mode, all at a minimal cost/expense. This is accomplished by means of providing the following:

A specially designed supplemental air-source heat exchanger (also referred to herein as a High Level Heat Dissipater ("HLHD") because relatively high temperature level hot gas/heat exiting the system's compressor is more easily dissipated into hot summer air via convective heat transfer than via only warm temperatures closer to the ambient air temperature) coupled to the primary vapor/hot gas line exiting the system's compressor, positioned between the compressor unit and the sub-surface geothermal heat exchange tubing, which supplemental air-source heat exchanger (or HLHD) is operable only in the cooling mode of system operation. The HLHD heat exchange tubing is sheltered from rain/moisture so as to prevent premature refrigerant condensation (before the refrigerant enters the ground), and has supply and discharge refrigerant transport tubing with relatively equally sized interior diameters, designed solely for mostly vapor (as opposed to liquid) refrigerant transport. The HLHD incorporates at least two check valves, or the like, so as to force hot compressor discharge gas through the HLHD unit in the cooling mode, and so as to prohibit the flow of geothermally warmed refrigerant gas through the HLHD in the heating mode.

The supplemental air-source heat exchanger (HLHD) is preferably comprised solely of at least one of finned heat exchange tubing (typically 12 to 14 fins per inch of length) and a plate heat exchanger, or the like, without a fan, which fan would solely be for optional use under extreme conditions. The HLHD is preferably sheltered from rain and preferably has entering and exiting refrigerant vapor transport lines that are equally sized.

Since one of the primary objectives of a DX system is to operate at a maximum efficiency level, and since the use of an optional fan necessitates an additional power draw, the use of a fan should preferably be entirely avoided, unless the power is supplied by a renewable energy source. While common finned tubing is described herein, any form of heat transfer tubing may be used, such as ridged tubing, plate heat exchangers, or the like. Tubing with an expanded surface area is preferable because it reduces the amount of tubing required for adequate heat transfer into the air. However, if plate heat exchangers are used, it is important that at least one good filter be placed in the refrigerant flow path to the plate heat exchanger, as only a tiny amount of debris can block adequate refrigerant flow through a plate heat exchanger.

A first check valve (or a suitable alternative, such as a solenoid valve) may be installed within a portion of the primary vapor/hot gas refrigerant transport line that normally by-passes the new supplemental air-source heat exchanger, so that the refrigerant flow is forced through the supplemental air-source heat exchanger in the cooling mode but can travel directly though the primary vapor transport line in the heating mode without traveling through the supplemental air-source heat exchanger at all. Otherwise, valuable geothermal heat temperature gain in the winter could be lost into the exterior air.

A second check valve (or suitable alternative) may be positioned in a second vapor refrigerant transport line exiting the air-source heat exchanger in the heating mode, thereby to prevent refrigerant flow through the air-source heat exchanger in the heating mode of operation and to permit geothermally warmed refrigerant to flow directly to the system's accumulator and compressor via the primary vapor/hot gas refrigerant transport line in the heating mode. As would be understood by those skilled in the art, the first check valve would be opened in the heating mode of operation, and the second check valve would be closed (the opposite of the positions in the cooling mode of operation).

The second vapor refrigerant transport line exiting the supplemental air-source heat exchanger should preferably be of the same size as the vapor refrigerant transport line entering the supplemental air-source heat exchanger. This is different from conventional air handler designs, where the exiting refrigerant transport line in the cooling mode is typically comprised of a smaller interior diameter liquid refrigerant transport line than that of the entering refrigerant transport line, so as to accommodate the mostly fully condensed refrigerant. In a preferable supplemental air handler design for use in conjunction with a DX system, testing has shown it is preferable for the supplemental air source heat exchanger disclosed herein not to fully condense the hot refrigerant vapor in the cooling mode, with or without a fan. Instead, complete condensing of the refrigerant preferably occurs beneath the earth's surface. If any significant condensing occurs within the supplemental air handler, the operational pressures within the geothermal heat exchange loop become too low and too much refrigerant is required for efficient system operation.

Further, if the size of the vapor refrigerant transport tubing at the supplemental air handler exit point is not the same size as the vapor refrigerant transport tubing at the supplemental air handler entry point, the operational head pressure of the system will be raised too high in the cooling mode, resulting in operational efficiency loss.

The vapor refrigerant transport tubing within the supplemental air handler is preferably comprised of at least one segment of finned tubing, and is preferably additionally distributed, via a first distributor, into multiple smaller interior diameter segments of finned tubing so as to increase air surface exposure area. In such a distributed array of tubing, the refrigerant should preferably next flow through a second distributor so as to exit the supplemental air handler within the same total interior area size tubing as that of the interior area size of the primary refrigerant vapor transport line entering the supplemental air handler.

A fan to blow exterior air over the tubing within the supplemental air handler, whether such tubing is comprised of one or multiple distributed finned refrigerant transport tube(s), or the like, may be used only when necessary (and preferably never) to help mitigate extreme over-design cooling load conditions. The fan may be powered by means of an electric supply source (such as a traditional electric supply source or a renewable energy supply source, such as solar or the like) connected to the fan's power cord. The fan should preferably operate on no more than 0.325 watts of power, plus or minus 5%, per one (1) linear foot of finned tubing (⅜ inch O.D. refrigerant grade tubing with 12 to 14 fins per linear inch) within the supplemental air handler (excluding the un-finned sideways "U" bends). For example, if there is 300 feet of finned tuning within the supplemental air handler, the fan should operate on no more than 97.5 watts of power, plus or minus 5%, so as to maintain the preferred 90 to 110 degree F. temperature range of the refrigerant fluid exiting the supplemental air handler.

The power provided to the fan is preferably provided by a renewable energy source (such as solar or the like) or a recoverable energy source (such as a waste heat source or a mechanical energy waste source). The fan power further preferably provides an airflow through the supplemental air handler of 0.8333 CFM (cubic feet per minute), plus or minus 5%, per one foot linear segment of finned tubing.

The supplemental air handler preferably has 0.0096 linear feet, plus or minus 5%, of ⅜ inch O.D. refrigerant grade finned (12 to 14 fins per linear inch) tubing per BTU of system cooling load design capacity when conventional ⅜ inch O.D. finned refrigerant transport tubing is used. For example, a 2.5 ton (i.e., 30,000 BTU) cooling system should preferably have 288 feet of finned tubing in the supplemental air handler, with a fan blowing 240 CFM through the finned tubing, where the fan requires no more than 93.6 watts of electrical power, with all numbers being within a permissible range of plus or minus 5%.

Via increasing the fan speed, the 0.0096 linear feet of finned tubing per BTU of system cooling load design capacity can be reduced by half, to a minimum of 0.0048 linear feet per BTU of system cooling load design capacity. However, increasing the fan speed entails more operational expense, and reducing the linear feet of finned tubing reduces heat transfer abilities when the fan is not used. Thus, increasing the fan speed and reducing the linear feet is not preferable, over the maximum fan speed and minimum linear feet per BTU of system cooling load design capacity as described herein, when standard/conventional ⅜ inch finned refrigerant transport tubing is used as a heat exchange means in such a supplemental air-source heat exchanger. Analogous and scalable criteria would be used for plate heat exchangers and the like.

Conversely, the fan speed and fan power requirements may be reduced by increasing the linear feet of finned tubing. However, too much finned tubing becomes cumbersome and more installation space is required. If space is not a concern, this is certainly a viable option. However, the preferred design is as set forth above, when standard/conventional ⅜ inch finned refrigerant transport tubing is used.

The finned tubing is preferably disposed within a containment tube, or the like. The containment tube may have outwardly flared bottom and top portions to create a natural circulation of air, via a vena contracta effect, when the air within the tube becomes heated and rises (when the optional fan is not in use). Further, the top of the containment tube may be sheltered from rain or other water, so as not to create premature refrigerant condensation within the tube before the refrigerant travels into the sub-surface geothermal heat exchange area.

Whenever a fan is used to increase the natural airflow within the containment tube, the fan blades are preferably placed at, near, or within the lower bottom portion of the containment tube, so that the fan motor will always be cooled by the incoming coolest air, thereby reducing fan operational power requirements.

As mentioned, a second check valve may be placed within the liquid refrigerant transport line exiting the air-source heat exchanger, so as to prevent refrigerant flow through the air-source heat exchanger in the heating mode of operation.

Preferably, the supplemental air-source heat exchanger is operated by means of natural convective heat exchange only, absent the operation of the typical air-source heat exchanger fan, which would be optional only. The optional fan may be controlled to operate only during over-design cooling load conditions. The fan within the HLHD may be controlled by a temperature or pressure control switch, or the like, where the fan is only engaged and operative when the preferred R-410A refrigerant's temperature exiting the HLHD unit is above 100 degrees F. and/or where the refrigerant pressure exiting the HLHD unit is above 317 psi. If the fan is engaged and operative below the said temperature and pressure levels, premature condensing of the refrigerant fluid may occur before the refrigerant vapor reaches the sub-surface heat exchanger, thereby requiring otherwise unnecessary and excessive amounts of refrigerant.

A preferred R-410A, or the like, refrigerant is used within the system. R-410A refrigerant is preferred for use within a DX system that incorporates such a supplemental air-handler system design because R-410A operates at a higher pressure than conventional refrigerants, such as R-22, and after losing heat and pressure in such a supplemental air handler design (an HLHD) as described herein, there is still enough pressure and suction remaining in the refrigerant within the sub-surface heat exchanger to push and pull the refrigerant through a Deep Well DX system design.

A supplemental air-source heat exchanger, designed as taught in this subject disclosure, will remove about 15 degrees F., plus or minus 5 degrees, of waste heat, without optional fan operation, before the refrigerant is next sent into the ground for a final typical additional approximate 70 degrees F., plus or minus 10 degrees F., waste heat removal. Thus, the supplemental air-source heat exchanger will typically take about 15% to 20% of the waste heat removal work load off the ground, which will help insure that lower geothermal heat exchange temperatures, and that greater system operational efficiency levels, are maintained throughout the cooling season, even in spite of abnormally high temperatures, system undersizing, or the like.

The use of such a supplemental air-source heat exchanger would be of particular importance in a DX trench system and/or in a DX pit system design, where the geothermal heat exchange tubing was installed within 10 feet of the ground surface, as well as of importance in any DX shallow well system where the geothermal heat exchange tubing was installed within 100 feet of the ground surface. Such near-surface heat exchange tubing installations are typically within common dirt/soils, with relatively low and poor heat transfer rates, as opposed to being within a rock formation, which rock formation would typically have a much greater heat transfer rate than common dirt/soils.

An additional refrigerant charge is preferably added when the supplemental air-source heat exchanger is installed. The refrigerant charge preferably equals a charge comprised of the total length of vapor refrigerant transport line between the exit (in the cooling mode) of the air-source heat exchanger and the connection to the primary refrigerant vapor transport line multiplied by 0.0375 pounds per linear foot, plus the total length of the ⅜ inch O.D. finned tubing within the supplemental air handler itself multiplied by 0.0375 pounds per linear foot (if other than ⅜ inch O.D. finned tubing is used for heat transfer within the air handler, an equivalency calculation must be performed), and plus one-half of the total length, in feet, of the un-finned sideways "U" bends connecting the finned tubing within the supplemental air handler.

So as to offset the additional refrigerant charge required by a supplemental air source heat exchanger when the system is operating in the cooling mode, a receiver must be added to the system's primary liquid refrigerant line for use when the system is operating in the heating mode. When the system is operating in the heating mode, the receiver must be designed to contain the same amount of refrigerant as that additional amount calculated for use in the cooling mode with a supplemental air source heat exchanger.

The exterior air-source heat exchange supplement would be exposed to the outside air, but would preferably be shaded by a covering, or the like, from the sun, as direct sunshine upon the finned tubing could heat the refrigerant within more than the outside air could cool the refrigerant. Further, testing has shown that the supplemental air handler may advantageously be sheltered from rain, as moisture on the supplemental heat exchange tubing prematurely accelerates refrigerant condensation and results in system operational pressures that are too low for system functional and/or efficient operation, absent the immediate addition of material amounts of refrigerant, which addition is not preferable to do.

The disclosed supplemental air-source heat exchanger, as described herein, essentially provides a High Level Heat Dissipater (HLHD) that is efficient in the air, because of the relatively high level temperature differentials between the hot refrigerant gas exiting the compressor and the exterior air (even in the summer), and that mitigates the heat absorption load placed upon the sub-surface geothermal heat transfer field, which field naturally typically provides an ultimate lower temperature heat sink than hot outside air.

The systems disclosed herein may also remove high level heat and excessive heat from a water-source geothermal system's hot gas vapor compressor discharge line before the heat is rejected into the water loop circulating beneath the surface, used for geothermal heat transfer. A water-source geothermal system, as well as the system's hot gas vapor compressor discharge line and sub-surface water loop, are all well understood by those skilled in the art, and are not depicted by drawings herein. The use of such a supplemental HLHD means in a water-source system application will also reduce the ultimate heat load upon the geothermal heat exchange field.

BRIEF DESCRIPTION OF THE DRAWINGS

These and other aspects and features of the disclosure will become more readily apparent upon reading the following detailed description when taken in conjunction with the accompanying drawings.

Figure 1:
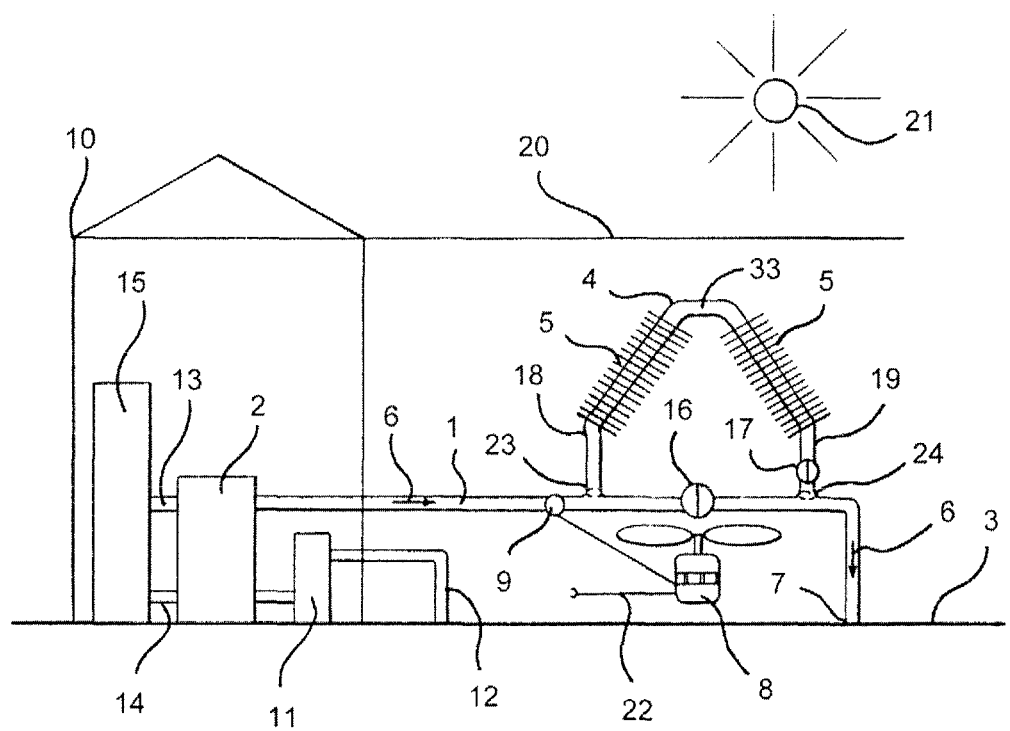
FIG. 1 is a side view of a direct exchange system having a primary vapor/hot gas refrigerant transport line with a supplemental air handler according to the present disclosure.

While the present disclosure is susceptible to various modifications and alternative constructions, certain illustrative embodiments thereof have been shown in the drawings and will be described below in detail. It should be understood, however, that there is no intention to limit the present disclosure to the specific forms disclosed, but on the contrary, the intention is to cover all modifications, alternative constructions, and equivalents falling within the spirit and scope of the present disclosure.

DETAILED DESCRIPTION

The following detailed description provides the best presently contemplated mode. The description is not intended in a limiting sense, and is made solely for the purpose of illustrating the general principles of this disclosure. The various features and advantages of the present disclosure may be more readily understood with reference to the following detailed description taken in conjunction with the accompanying drawings.

Referring now to the drawings in detail, where like numerals refer to like parts or elements, FIG. 1 shows a side view of a direct exchange system having a primary vapor/hot gas refrigerant transport line 1 situated between a compressor 2 and the earth's surface 3. The primary transport line 1 is operatively connected to an exterior air-source heat exchange supplement, or high level heat dissipater (HLHD) 4, which includes finned refrigerant transport tubing 5 exposed to the exterior air outside of the interior space. After exiting the HLHD 4, the refrigerant (the flow direction of which is indicated by arrows 6) travels into the sub-surface entry point 7 to the sub-surface geothermal heat exchanger (not shown herein, as sub-surface geothermal heat exchangers come in a variety of designs that are well understood by those skilled in the art). An optional electric fan 8, with a power cord 22 for connection to an electrical power source (not shown) is shown positioned under the HLHD 4 for optional use in the event of high, extreme, or over-design system operational temperatures and pressures, as well as for optional use to decrease the heat absorption load otherwise placed upon the sub-surface geothermal heat exchanger.

A temperature or pressure controlled switch 9, or the like, is attached to the primary vapor/hot gas refrigerant transport line 1 to selectively activate the fan 8. Both a temperature controlled switch and a pressure controlled switch 9 are well understood by those skilled in the art. The compressor 2 may be situated indoors or outdoors, as is well understood by those skilled in the art, although the compressor unit 2 is shown here as being situated within a building/structure 10.

The size of the primary hot gas vapor refrigerant transport line 1 at the supplemental air handler entry point 23 is the same as the size (the same interior diameter) of the primary hot gas vapor refrigerant transport line 1 at the supplemental air handler exit point 24 (not necessarily drawn to scale). Although the vapor refrigerant transport line 1 is shown herein as comprised of at least a single line 1, the vapor refrigerant transport line 1 may optionally be divided into multiple distributed smaller vapor refrigerant transport lines (as shown hereinafter in FIG. 2).

To offset the additional refrigerant charge required by the supplemental air source heat exchanger 4 when the system is operating in the cooling mode, a receiver 11 is preferably added to the system's primary liquid refrigerant transport line 12 for use when the system is operating in the heating mode. A receiver 11 is well understood by those skilled in the art, and essentially consists of a containment vessel that fills up with a liquid phase refrigerant to a predetermined level in the heating mode, and that empties out in the cooling mode, so that the additional refrigerant is operative within the overall system. The primary liquid refrigerant transport line 12 is shown here as exiting from the earth's surface 3 and being operatively connected to the receiver 11, adjacent to the compressor unit 2.

As is well understood by those skilled in the art, an interior vapor refrigerant transport line 13 and an interior liquid refrigerant transport line 14 would be operatively connected between the compressor unit 2 and an interior heat exchange means 15 (typically an interior air handler). When the system is operating in the heating mode, the receiver 12 preferably contains the same amount of refrigerant as that additional amount of refrigerant calculated for use in the cooling mode with an exterior supplemental air source heat exchanger (HLHD) 4.

A first check valve 16 is installed a portion of the primary vapor/hot gas refrigerant transport line 1 which is located between the first supplemental vapor refrigerant line 18 entering into the air-source heat exchanger 4 in the cooling mode, and the supplemental liquid refrigerant line 19 exiting from (out of) the supplemental air-source heat exchanger (HLHD) 4 in the cooling mode, so that the refrigerant flow is forced through the HLHD 4 in the cooling mode, but can travel directly though the primary vapor transport line 1 in the heating mode (not shown herein, where the refrigerant would be traveling in a reverse direction as depicted herein in the cooling mode of operation) without traveling through the supplemental air-source heat exchanger (HLHD) 4 at all, and effectively by-passing the HLHD 4.

A second check valve 17 may be located within the second vapor refrigerant transport line 19 exiting the supplemental air-source heat exchanger (HLHD) 4 in the cooling mode, so as to prevent refrigerant flow through the air-source heat exchanger (HLHD) 4 in the heating mode of operation. As would be understood by those skilled in the art, although not shown herein, the first check valve 16 would be opened in the heating mode of operation, and the second check valve 17 would be closed (the opposite of the positions shown herein in an operative cooling mode by each respective valve, 16, and 17).

An unfinned U bend segment 33 of the finned refrigerant transport tubing 5 is shown connecting the finned tubing 5 within the exterior supplemental air-source heat exchanger (HLHD) 4.

The second vapor refrigerant transport line 19 exiting the supplemental air-source heat exchanger (HLHD) 4 in the cooling mode is preferably a vapor refrigerant transport line 19, and not a smaller diameter liquid line (not shown herein as same is well understood by those skilled in the art) as would commonly be the case in a conventional air-source heat exchanger, since the supplemental air source heat exchanger (HLHD) 4 is preferably configured to only partially, rather than fully, condense the hot refrigerant vapor in the cooling mode in its preferred method of operation, either with or without a fan 8. Complete condensing of the refrigerant in a DX system design should preferably occur beneath the earth's surface 3. The fan 8 would solely be used only when necessary (preferably never) to help mitigate extreme overdesign cooling load conditions, and/or to lessen the heat absorption load in the subsurface environment beneath the earth's surface 3. The fan 8 may be powered by an electric supply source (not shown herein) connected to the fan's power cord 22, and preferably via a renewable energy electrical supply source, such as solar, for example.

The exterior air-source heat exchange supplement (HLHD) 4 would be exposed to the outside air, but would preferably be shaded by a covering 20, or the like, from the sun 21, as direct sunshine upon the finned tubing 5 could heat the refrigerant within more than the outside air could cool the refrigerant. Here, the covering 20 is shown as extended from the building/structure 10. The covering 20 would also serve to keep rain/moisture off the finned refrigerant transport tubing 5 of the supplemental air-source heat exchanger (HLHD unit) 4, so as to prevent premature condensation of the refrigerant (refrigerant flow direction is indicated by arrows 6).

Figure 2:
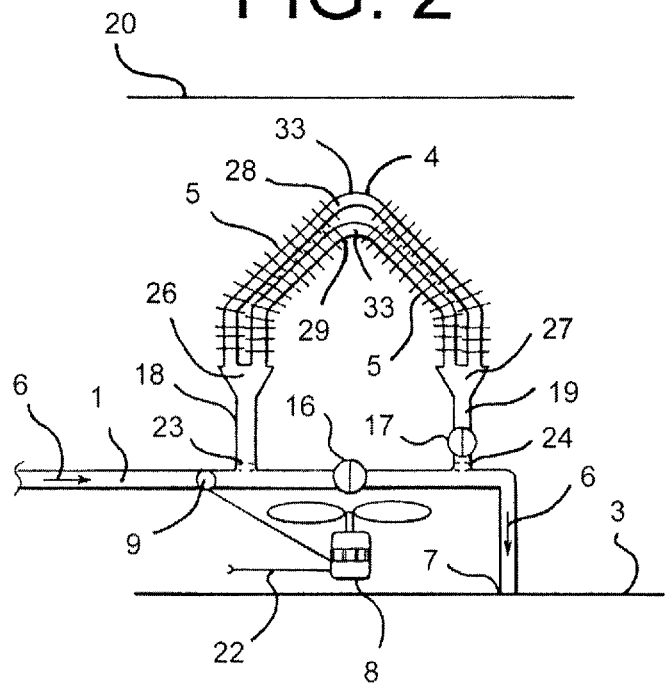
FIG. 2 is a side view of an alternative supplemental air handler according to the present disclosure.

FIG. 2 is a side view of an alternative embodiment, with the primary vapor refrigerant transport line 1 connected to the supplemental air handler entry point 23, with the first vapor refrigerant transport line 18 entering a first distributor 26, which thereafter breaks the primary line 18 into multiple smaller vapor refrigerant transport lines, herein shown as a first distributed vapor refrigerant transport line 28 and a second distributed vapor refrigerant transport line 29. Typically, there would be more than the two distributed vapor refrigerant transport lines, 28 and 29, shown herein as an example only.

The multiple smaller lines 28 and 29 may be provided as finned refrigerant transport tubing 5 (commonly comprised of ⅜ inch O.D. refrigerant grade transport tubing with 12 to 14 fins per linear inch, or the like) so as to increase air contact heat transfer surface area. Prior to exiting the supplemental air handler (HLHD) 4 at the exit point 24, the multiple smaller lines 28 and 29 connect to a second distributor 27, which places the now cooled, but only partially condensed, refrigerant back into the second vapor refrigerant transport line 19.

An optional fan 8 is also shown, which may be operated as preferred and/or as necessary by a temperature or pressure controlled switch 9. The fan 8 is shown with an electric power cord 22 and is positioned below the finned refrigerant transport tubing 5 used for convective heat transfer, so that the fan will not be subjected to the warmer/hot air discharged from the supplemental air handler (HLHD) 4, which warmer air could shorten the life of the fan 8.

The directional flow of the refrigerant is indicated by arrows 6. As in FIG. 1 above, there are preferably two check valves 16, and 17, so as to force the refrigerant through the supplemental air handler (HLHD unit) 4 in the cooling mode, but so as to prevent refrigerant flow through the supplemental air handler (HLHD) 4 in the heating mode (in the heating mode, the directional flow of the refrigerant would be reversed from that shown herein in the cooling mode). Check valves 16 and 17 are well understood by those skilled in the art. The check valve 17 in the second vapor refrigerant transport line 19 should preferably be situated just above the supplemental air handler exit point 24, and before the second distributor 27, in the cooling mode, so as to prevent refrigerant from entering the supplemental air handler (HLHD) 4 when operating in the heating mode (not shown).

An unfinned, U bend segment 33 of the refrigerant transport tubing 5 is shown connecting the finned tubing sections 5 of the exterior supplemental air-source heat exchanger (HLHD) 4.

Figure 3:
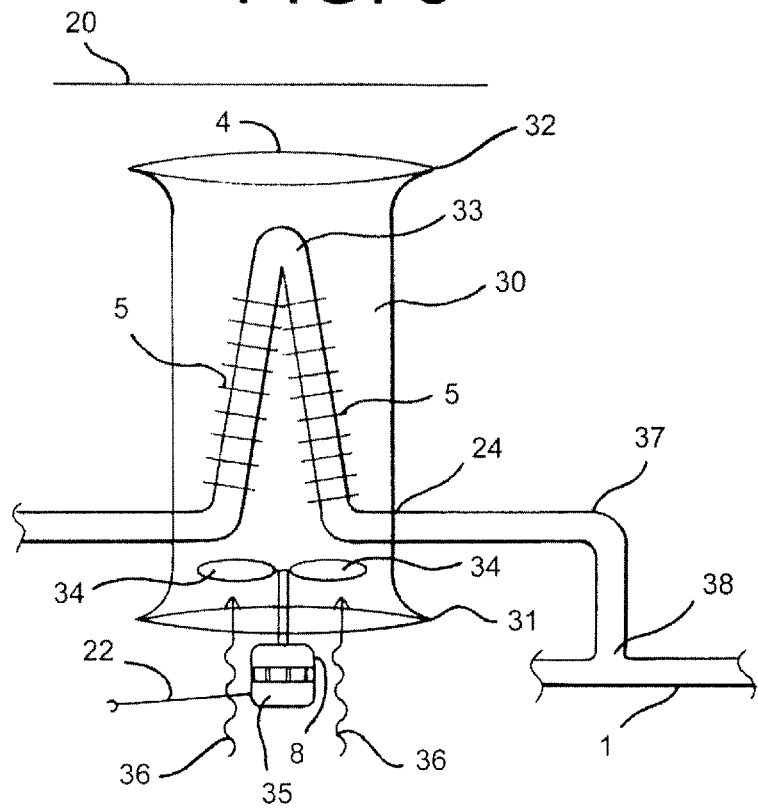
FIG. 3 is a side view of an elongated containment tube at least partially enclosing the supplemental air handler.

FIG. 3 is a side view of an elongated containment tube 30, with a wider diameter bottom 31 and a wider diameter top 32, so as to create natural airflow through the containment tube 30 via a vena contracta effect when the fan 8, with an electric power supply cord 22, is not in use. A covering 20 must be provided for the containment tube 30, so as to prevent rain/moisture from wetting the finned refrigerant transport tubing 5. If the refrigerant transport tubing 5 was wetted, evaporative cooling could occur, which could reduce the refrigerant temperature/pressure too much, so as to cause premature condensation.

The finned refrigerant transport tubing 5 is shown herein as if one side of the containment tube 30 had been cut away, thereby exposing the refrigerant transport tubing 5 to full view. The fan 8 is preferably situated so that at least the fan blades 34 are within the wider diameter bottom 31 of the containment tube 30. The electric motor 35 should preferably be beneath the blades 34 so that the coolest air (depicted by arrows 36) is circulated over the motor 35, thereby decreasing power requirements and increasing operational efficiencies and fan life.

An unfinned segment of a U bend 33 is shown herein, as this segment is treated separately from the finned tubing 5 for charging calculation purposes.

Further, in this drawing, the finned refrigerant transport tubing 5 within the containment tube 30 is shown for refrigerant charge calculation purposes, which is disclosed herein as being taught on the basis of footage length of finned ⅜ inch O.D. refrigerant grade tubing 5 (not drawn to scale). Also, the unfinned U bend segment 33 that connects the finned refrigerant transport tubing sections 5, as well as a length of vapor refrigerant transport line 37 between the supplemental air hander exit point 24 (in the cooling mode) and the connection point 38 to the primary refrigerant vapor transport line 1, is shown herein for refrigerant charge calculation purposes as taught herein While only certain embodiments have been set forth, alternatives and modifications will be apparent from the above description to those skilled in the art. These and other alternatives are considered equivalents and within the spirit and scope of this disclosure and the appended claims.

What is claimed:

1. A direct exchange heating/cooling system having a heating mode and a cooling mode, the system comprising: a sub-surface geothermal heat exchanger including sub-surface heat exchange tubing; an interior heat exchanger; a primary vapor line extending between the interior heat exchanger and the sub-surface geothermal heat exchange tubing; a compressor fluidly communicating with primary vapor line; a refrigerant disposed in the primary vapor line and pressurized by the compressor, the refrigerant having a heating mode refrigerant flow direction through the primary vapor line from the sub-surface geothermal heat exchanger to the compressor and then to the interior heat exchanger, and a cooling mode refrigerant flow direction through the primary vapor line from the compressor to the sub-surface geothermal heat exchanger and then to the interior heat exchanger, the refrigerant in the cooling mode having a waste heat content; a controller for selectively operating the system in the heating and cooling modes; and a supplemental air-source heat exchanger including: a supply line having a supply line inlet fluidly communicating with an upstream point of the primary vapor line, and a supply line outlet; a discharge line having a discharge line inlet in fluid communication with the supply line outlet, and a discharge line outlet fluidly communicating with a downstream point of the primary vapor line, wherein the upstream point is located nearer the compressor than the downstream point; the supply and discharge line providing supplemental heat transfer tubing configured to solely pre-cool the hot gas refrigerant exiting the compressor such that the hot gas in the air-source unit portion is not materially condensed; a flow director associated with the primary vapor line and the supplemental air-source heat exchanger, the flow director having a cooling mode configuration that diverts refrigerant from the primary vapor line to flow through the supply and discharge lines when the refrigerant travels in the cooling mode refrigerant direction, and a heating mode configuration in which refrigerant is blocked from the supply and discharge lines when the refrigerant travels in the heating mode refrigerant flow direction.

2. The system of claim 1, in which each of the supply and discharge lines of the supplemental heat transfer tubing comprises refrigerant grade finned tubing having a ⅜ inch outside diameter and approximately 12 to 14 fins per linear inch, and in which the total length of finned tubing in the supply and discharge lines of the supplemental heat transfer tubing is approximately 0.0096 linear feet, plus or minus 5%, per BTU of the cooling load design capacity, where the cooling load design capacity is measured in BTUs.

3. The system of claim 1, in which a fan is provided to generate an air flow across each of the supply and discharge lines of the supplemental heat transfer tubing, where the fan is operatively controlled by at least one of a temperature activated switch which activates the fan when the refrigerant temperature exiting the discharge lines of the supplemental heat transfer tubing is above approximately 100 degrees F., and a pressure activated switch which activates the fan when the refrigerant pressure exiting the discharge lines of the supplemental heat transfer tubing is above approximately 317psi.

4. The system of claim 3, in which the fan has a power draw of no more than approximately 0.325 watts, plus or minus 5%, per each linear foot of finned tubing provided by the supply and discharge lines, and where the fan is configured to have a fan air flow of approximately 0.8333 cubic feet per minute, plus or minus 5%, per each linear foot of finned tubing provided by the supply and discharge lines.

5. The system of claim 2, further comprising an unfinned U-bend segment extending between the supply line outlet and the discharge line inlet.

6. The system of claim 5, in which an initial refrigerant charge is disposed in the system, the system further comprising an additional refrigerant charge for operating the supplemental air-source heat exchanger, wherein the additional refrigerant charge is determined by an overall length of the supply and discharge lines multiplied by 0.0375 pounds per linear foot, plus a total length of the ⅜ inch outside diameter finned tubing in the supply and discharge lines multiplied by 0.0375 pounds per linear foot, plus one-half of a total length, in feet, of the unfinned U bend segment.

7. The system of claim 1, further comprising a containment tube configured to shelter the supply and discharge lines from moisture.

8. The system of claim 7, in which the containment tube includes outwardly flared upper and lower portions.

9. The system of claim 1, in which the supply and discharge lines have equally sized interior diameters.

10. The system of claim 1, in which the flow director comprises a first check valve disposed in the primary vapor refrigerant line between the upstream and downstream points and a second check valve disposed in one of the supply and discharge lines.

* * * * *